June 3, 1958  G. L. HILL  2,837,714
METHOD OF TESTING ELECTRICAL INSULATION
Filed March 31, 1954  4 Sheets-Sheet 1

INVENTOR
George Leslie Hill

June 3, 1958 G. L. HILL 2,837,714
METHOD OF TESTING ELECTRICAL INSULATION
Filed March 31, 1954 4 Sheets-Sheet 2

INVENTOR
George Leslie Hill

June 3, 1958            G. L. HILL            2,837,714

METHOD OF TESTING ELECTRICAL INSULATION

Filed March 31, 1954            4 Sheets-Sheet 3

INVENTOR
George Leslie Hill

INVENTOR
George Leslie Hill

United States Patent Office 2,837,714
Patented June 3, 1958

2,837,714

METHOD OF TESTING ELECTRICAL INSULATION

George Leslie Hill, Oakland, Calif.

Application March 31, 1954, Serial No. 420,026

9 Claims. (Cl. 324—54)

My invention relates to the testing of electrical insulation; and more particularly to the use of high voltage direct current and apparatus for testing purposes.

One of the objects of my invention is the provision of an insulation testing method of a non-destructive nature.

Another object of the invention is the provision of a method for collecting data related to the dielectric strength of the insulation under test, and evaluating the data so obtained to arrive at an ultimate value of dielectric strength.

Another object is the provision of a method for determining the relationship between direct current dielectric strength and alternating current dielectric strength of a given insulating material.

Still another object of my invention is the provision of a method for determining the dielectric characteristics of a given insulating material, wherein the electric power consumption for conducting the test is reduced to about $\frac{1}{100}$ of that consumed in conventional alternating current methods.

Still another object of my invention is the provision of an apparatus for testing electrical insulation with high voltage direct current.

Still another object is the provision of a test apparatus of the character described which is subject to very close control by the engineer conducting the test.

Still another object of my invention is the provision of an apparatus of the character described which is compact, easily portable and economical to manufacture and operate.

The invention possesses other objects and features of value, some of which, with the foregoing, will be apparent from the following description and the drawings. It is to be understood that I do not limit myself to the embodiment shown and described, but may adopt various forms within the scope of the appended claims.

Referring to the drawings.

Figure 1:
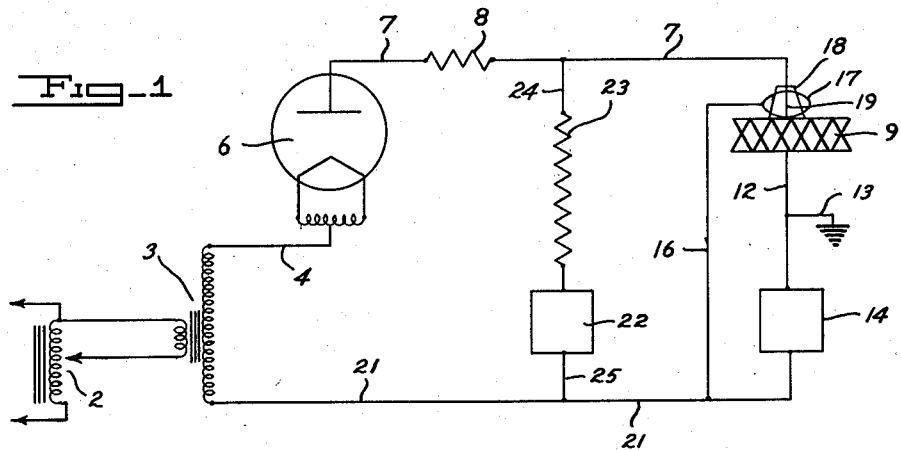
Fig. 1 is a view showing diagrammatically the instruments and electrical circuit of my apparatus.

Broadly considered, my invention comprises a simplified apparatus and a method for determining the dielectric strength of insulation in electrical apparatus, especially in large rotating electrical machines such as are found in hydro-electric plants, steam-electric plants and synchronous condensers, by the use of high voltage direct current.

The invention broadly comprises rectifying increasing increments of high voltage alternating current to high voltage direct current. The high voltage direct current is then impressed on the insulation under test, and by means of a high voltage voltmeter and a microammeter, the voltage applied and the current passing through the insulation are indicated for each increment of impressed voltage.

The engineer conducting the test then plots and evaluates the indicated data. The directional characteristics and magnitude of a line through the plotted values, determines the dielectric strength of the insulation under test.

There has always been a need for a non-destructive method of testing and determining the dielectric strength of the insulation in large electrical rotating machinery such as motors, generators, rotating synchronous condensers, and the insulation used in bushings, static condensers, transformers etc.

The need for a non-destructive test that would enable a diagnosis to be made of the dielectric strength of the electrical insulation in large rotating machines has been especially brought out in various engineering papers when the cost of a repair or rewind job is considered. Also when taking into account the losses involved if a failure occurs at a time when a generator or motor is badly needed or when water may have to be by-passed in a large hydro-plant.

The most common method of testing the electrical insulation in high voltage apparatus has been to apply a high voltage alternating current for a given period of time. The voltage to apply and the duration of its application has generally been determined by the test codes of the American Institute of Electrical Engineers such as No. 503 entitled "Test Code of Synchronous Machines," and the American Standards Association Test Code No. C 50—1943.

The high voltage alternating current is usually obtained from a step-up potential transformer using a variable voltage regulator in the primary of the step-up transformer for regulation. The overvoltage to apply in acceptance tests has been covered by the standards previously referred to, but the overvoltage applied during maintenance testing has been the subject of much discussion and it has been considered a risk to apply too high an alternating current test voltage.

Experience and engineering test data and research has shown that both alternating current acceptance tests and maintenance overvoltage tests can damage the insulation without the knowledge of the test engineer. Puncture of the insulation may occur a few seconds prior to and/or at the termination of the one minute test period. Puncture can also occur after the one minute test period and after the operator has started to reduce the alternating current voltage by use of the regulator. It is generally accepted that the alternating current high potential test is a "go" or "no go" test, and to my knowledge no method of predicting the dielectric strength of the insulation without puncturing it has heretofore been found.

Alternating current power factor tests are another means of testing insulation. The power factor of the insulation is obtained by measurements made with a voltmeter, ammeter and wattmeter, or with a special bridge circuit such as the Schering bridge. Tests and experience have shown that it is usually impossible to correlate the power factor of insulation with its dielectric strength. Laboratory and field tests have been made on new and old insulation in which it was impossible to predict the dielectric breakdown strength by means of the power factors of the insulation.

Figure 2:
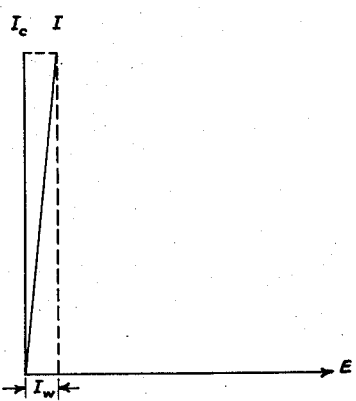
Fig. 2 is a vector diagram illustrating the difficulty of determining the dielectric strength of insulation by the conventional alternating current power factor method.

The vector diagram of Fig. 2 illustrates the difficulty of determining the dielectric strength of insulation from the values of power factor. The power factor is expressed by $Iw/I$ where $I$ is the total current and $Iw$ is the current in phase with the voltage. $Iw$ may, in turn, be considered as the sum of currents due to (a) dielectric loss, (b) conduction through the insulation, and (c) leakage over the surface and stray losses.

The conduction current passing through the insulation is the current we are primarily interested in, but it cannot (with the present instrumentation available) be separated from the total current. The test engineer, when making non-destructive tests with alternating current to determine the power factor, may easily apply an alternating current voltage that is too high and thereby damage the insulation. He has no warning when near the danger point.

The direct current testing of electrical insulation has generally been made according to the American Institute of Electrical Engineers Standard No. 43 entitled "Testing Insulation Resistance of Rotating Machinery."

Figure 3:
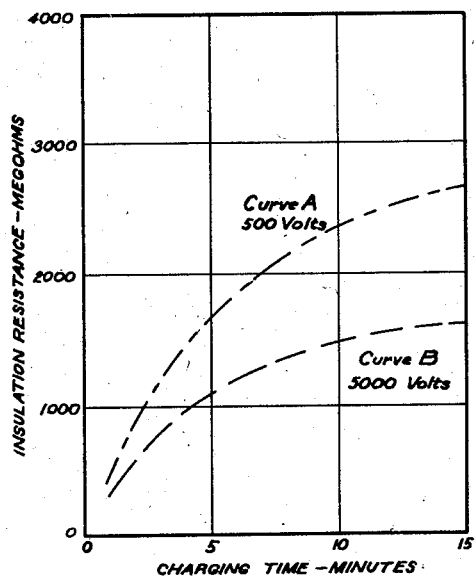
Fig. 3 illustrates the test curves resulting from tests on insulation made according to Standard No. 43 of the American Institute of Electrical Engineers, conventionally known as the dielectric absorption test to obtain the polarization index.

The dielectric absorption test curves of this standard (shown in Fig. 3) and the polarization index are taken as a means of determining the condition of the insulation. The recommended voltages of 500 and 5000 volts are held constant and the insulation resistance (in megohms) as a function of time is obtained. The time is usually 10 minutes.

The polarization index is defined as the ratio of insulation resistance obtained at the end of a 10 minute period to the insulation resistance obtained at the end of a one minute period when 500 volts are applied to the insulation.

Polarization index values usually vary from 1.5 to 3 or more depending on the condition and moisture content of the insulation. No definite relation between polarization index and dielectric strength has heretofore been determined and it has not been possible to predict dielectric strength or diagnose the condition of the insulation from the polarization index obtained on any insulation.

Another common method of testing insulation is by use of an instrument called a "Megger." This instrument is essentially a high range ohmmeter the power for which is supplied by a small hand or motor operated direct current generator. The applied voltage is constant at some value such as 500, 1250 or 2500 volts. The current is measured by an instrument which is scaled in megohms.

More specifically, and referring now to the drawings, my invention includes the apparatus shown diagrammatically in Fig. 1, wherein is illustrated a variable alternating voltage regulator 2 adapted for manipulation by the engineer conducting the test, and a high voltage step-up alternating current transformer 3 controlled by the regulator 2. Through an appropriately insulated conductor 4, the stepped-up alternating high voltage is fed into a rectifier tube 6, conveniently of the half-wave type. A full-wave rectifier may of course be used, however since portability, simplicity and compactness are desirable, I find the half-wave rectifier convenient. Utilizing the capacitance of the machine under test tends to smooth the wave out when dielectric absorption is reached.

The high voltage, unidirectional output of the rectifier is carried by means of the conductor 7, through the current limiting resistor 8 and is impressed on the insulation 9 being tested. A conductor 12, provided with a ground lead 13, delivers to a microammeter 14 the current which is passing through the insulation 9.

For each increment of applied direct current voltage, the value indicated by the microammeter is noted by the testing engineer. To eliminate the possibility of error in the values indicated by the microammeter due to stray surface leakage currents, a guard circuit is provided for by-passing such surface leakage currents around the microammeter. The guard circuit is conveniently of the conventional type, and is interposed in the circuit by means of the lead 16, which is provided with a conducting loop 17 circumscribing the insulator 18 positioned around the terminal end 19 of the conductor 7. An insulated conductor 21, connecting the microammeter with the low potential side of the step-up transformer 3, receives the stray leakage current from the lead 16.

To indicate the voltage drop between the conductors 7 and 21, a voltmeter 22 is provided. The voltmeter is preferably calibrated in kilo-volts, and is provided with a high resistance current resistor or multiplier 23, preferably having a calibrated resistance of the order of 50 to 100 megohms. Short leads 24 and 25, respectively, connect the resistor to the lead 7, and the voltmeter to the conductor 21. Values indicated by the voltmeter, together with the microammeter values noted, are plotted on suitable coordinate paper, and the plotted points connected by a line.

One method of determining the dielectric strength of the insulation is to plot the microammeter values indicated as the ordinate in a system of coordinates. The kilo-volt values are plotted as the abscissa, and the resulting points will define a curve, the directional characteristics and magnitude of which, indicates the dielectric strength of the insulation under test. It is of course understood that to obtain accurate readings of indicated values, the test engineer should await a stabilized reading of microamperes at each increment of applied direct current kilo-volts.

Thus, it is apparent that by use of my apparatus and method, the test engineer is in complete and close control of the test at all times; thereby reducing to a minimum the likelihood of impressing a destructive voltage on the insulation under test.

Figure 4:
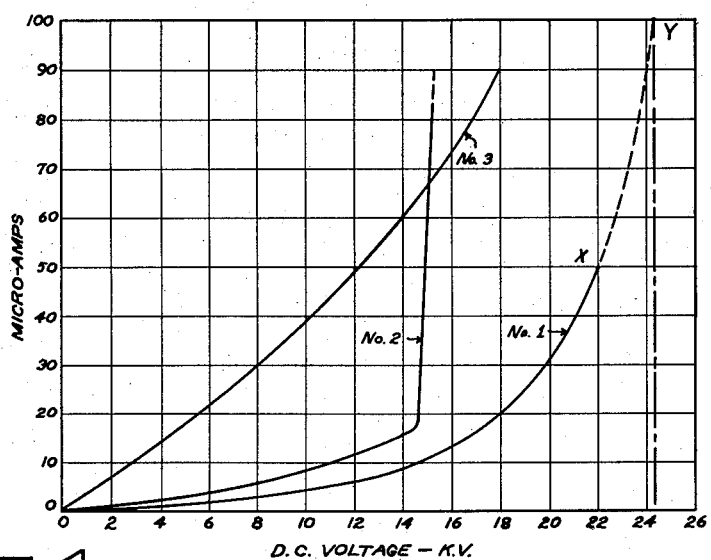
Fig. 4 illustrates typical curves obtained by use of my high voltage direct current testing method when kilovolts are plotted versus micro-amps.
Figure 5:
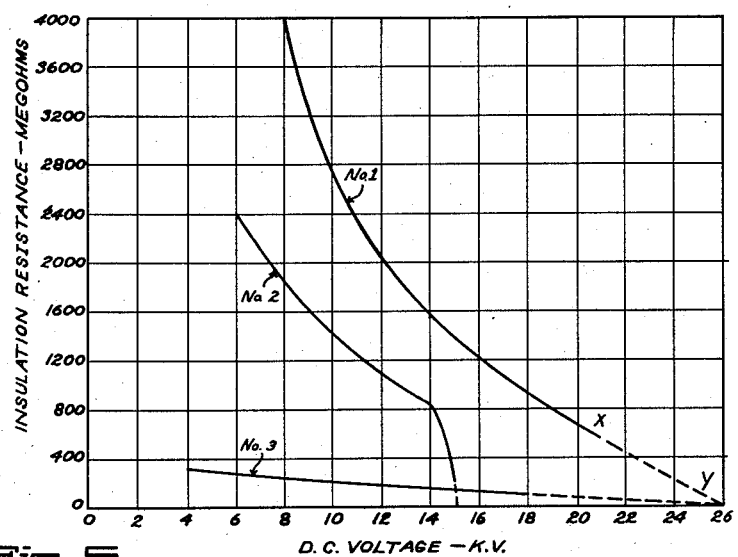
Fig. 5 illustrates typical curves obtained by my method when kilo-volts are plotted against the insulation resistance or megohms.

In this respect, Figs. 4 and 5 illustrate typical curves obtained during high voltage direct current testing. In Fig. 4, micro-amps are plotted against direct current voltage expressed in kilo-volts; and in Fig. 5, calculated megohms are plotted against kilo-volts. In Fig. 4, curve 1 is the typical curve obtained when testing solid homogeneous insulation in good condition. Curve 2 is the typical curve obtained when the insulation is faulty due to aging, oil, dirt, heat, mechanical damage etc. Curve 3 is the typical curve obtained when the insulation is in a moist condition.

The procedure of the test is as follows:

The test engineer increases the applied high voltage in small increments, preferably of the order of about 10% of the ultimate test value, and plots the readings of direct current micro-amps versus the indicated direct current kilo-volts. This plotting is done while the test is in progress. The maximum direct voltage to apply is determined before the tests start, preferably by consideration of the rating and age of the apparatus under test. In this regard, experience is a valuable tool. While the test is in progress, if a sudden increase of current occurs, a "knee" or sharp bend will be observed in the curve defined by the plotted values. At this point the test is discontinued and steps are taken to determine the cause of the sudden increase in current. From the above, the reason for awaiting a stabilized reading of micro-amperes at each increment of applied voltage becomes obvious. This, in effect, is the stabilized current reading in a series of absorption tests, each additional higher level of dielectric absorption current being obtained by adding definite voltage steps on some lower value.

When the test engineer is desirous of obtaining the direct current puncture value without puncturing the insulation, he plots the direct current micro-amperes versus direct current kilo-volts up to a point where the plotted values approach a tangent which is perpendicular to the abscissa axis, and then extends or extrapolates the curve. He then draws the tangent to the curve and the point where the tangent intercepts the abscissa axis at 90 degrees will be the predicted direct current puncture value of the insulation. This becomes a very valuable tool to obtain the predicted alternating current dielectric strength of the insulation by applying the direct current/alternating current dielectric strength ratio. If the alternating voltage is increased to the puncture value this method then is used to obtain the direct current/alternating current dielectric strength ratio of the insulation under test.

The insulation resistance in megohms may also be plotted versus direct current kilo-volts as shown in Fig. 5, but experience has shown that a better method of diagnosis of the dielectric strength of the insulation can be obtained from the direct current micro-amperes versus direct current kilo-volt curve. As an example, let us assume two generators, one of which has four times the area of the other and each wound with the same type and thickness of insulation and in the same condition. The larger machine will have one-fourth the megohms resistance of the smaller but its insulation is just as good. Conversely, if the smaller machine has the same megohms as the larger, its insulation would not be as good.

Figure 6:
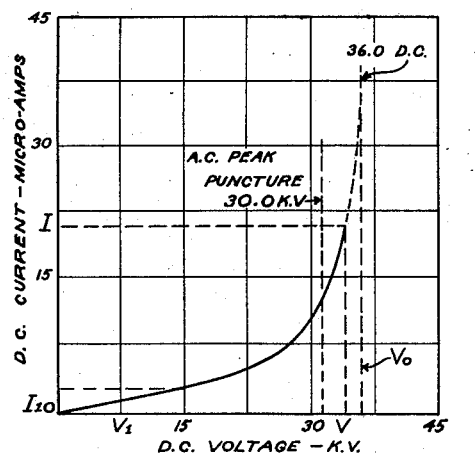
Fig. 6 illustrates graphically the method of obtaining the predicted and actual value of ultimate or peak dielectric strength of an insulation as determined by high voltage direct current and the actual peak dielectric strength of the same insulation when tested with alternating current.

Fig. 6 shows the method of obtaining the direct current/alternating current dielectric strength ratio. The curve of direct current micro-amperes versus direct current kilo-volts was obtained by the method previously decsribed and the direct current applied voltage stopped at the point X (34.0 kv. D.-C.). The direct current was removed, but the curve was extrapolated to obtain the predicted direct current puncture point Z (35.5 kv. D.-C.) by projecting the tangent Y to the axis of abscissas. Alternating current was then applied and the alternating current peak puncture value of 30.0 kv. A.-C. was obtained. A large number of tests were made and the average direct current/alternating current (R. M. S.) ratio of 1.75 was obtained.

The direct current dielectric strength of electrical insulation may also be obtained by calculation of the curve instead of by extrapolation. A formula or equation used is as follows:

$$I = \frac{aV}{\left(1 - \frac{V}{V_0}\right)\frac{1}{N}} \qquad V_0 = \frac{V}{1 - \left(a \cdot \frac{V}{I}\right)N}$$

where, referring to Fig. 6:
I and $I_1$ equal direct current in micro-amperes,
V and $V_1$ equal direct current voltage in kilo-volts,
$V_0$ equals direct current puncture voltage, and
$a$ equals $I_1/V_1$.

I and V are obtained near the upper or final point in the curve. $I_1$ and $V_1$ are obtained near the lower or linear portion of the curve. N is an exponential constant for a given insulation. $V_0$ is the asymptote, and $a$ is the conductivity of the insulation at the lower linear portion of the curve.

Figure 7:
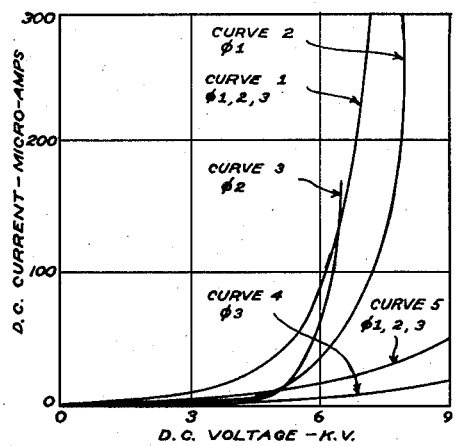
Fig. 7 illustrates actual test curves obtained from a generator installation which had been flooded.

Fig. 7 shows curves obtained on one of 3 generators in a hydro-plant after it was flooded by high water backing up from the river. Curve No. 1 shows all phases tested together. The rapid rise in current started at about 5 kv. The phases were separated and curve No. 2 was obtained on phase 1, curve 3 on phase 2 and curve No. 4 on phase 3.

After noting the difference between phases 1 and 2 and phase 3, it is obvious that both phases 1 and 2 had bad insulation. A total of seven coils were found bad and replaced. Curve No. 5 was obtained on all phases after the repairs were made on phases 1 and 2. Thus, an expensive rewind job was avoided.

Figure 8:
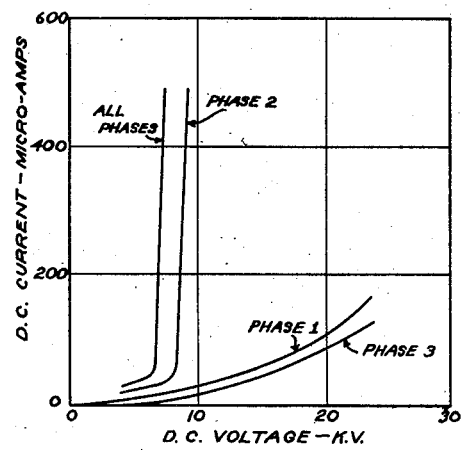
Fig. 8 illustrates actual test curves obtained from a synchronous condenser.

Fig. 8 shows the tests on a synchronous condenser rated at 9000 kva. at 12000 volts. This machine was first tested with all phases tied together and a very rapid rise in current was noted to start at 6 kv. and 23 micro-amps. At 7 kv. the current rose to 400 micro-amps.

The phases were separated and each tested separately; phase 2 showed a similar characteristic curve as the curve of all phases, starting with 18 micro-amps at 8 kv. and rising to 500 micro-amps at 18.5 kv. Phases 1 and 3 showed satisfactory characteristics.

Figure 9:
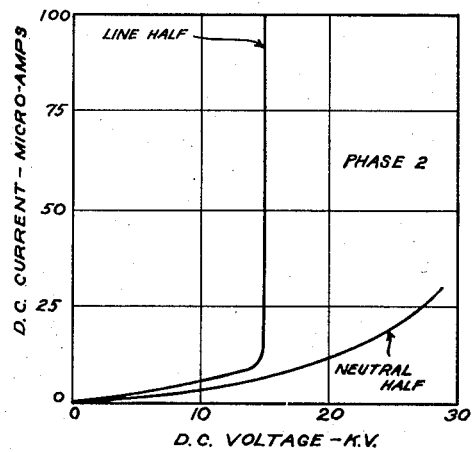
Fig. 9 shows the results of tests on the same synchronous condenser, but after dividing the winding at a convenient place.

Fig. 9 shows the results of tests on phase 2 after dividing the winding at a convenient place near the middle. The half of the winding which had been connected to the line showed bad at a direct current voltage starting at about 14.0 kv. or the equivalent alternating current voltage of 14.0/1.75 or about 8.0 kv. A.-C. The neutral half of the winding showed good characterisics up to 25 kilo-volts direct current and above. The bad half of the winding was changed to the neutral half and the good neutral half of the winding changed to the line side. This machine is operating satisfactorily and an expensive rewind job was avoided by the ability to diagnose this insulation. An alternating current high potential would have punctured the winding.

Figure 10:
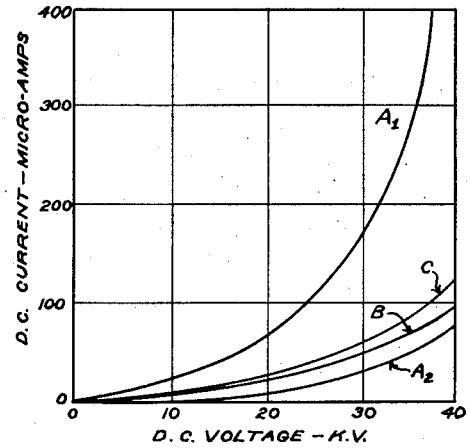
Fig. 10 illustrates evaluated "before and after repair" test data on three 4250 kva. 72000/6600 transformers.

Fig. 10 shows tests on three 4250 kva. 72000/6600 transformers. Curves $A_1$, B and C show transformer $A_1$ bad. After repairs and cleaning curve $A_2$ was obtained.

Figure 11:
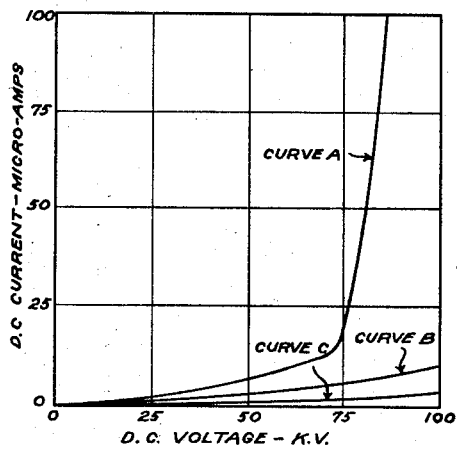
Fig. 11 illustrates evaluated test data on several 69 kv. condenser-type bushings.

Fig. 11 shows test results on several 69 kv. condenser-type bushings. Curve A showed a bushing with faulty insulation whereas curves B and C are the maximum and minimum readings of current obtained on several good bushings.

It has been definitely determined by laboratory and field test data that the dielectric strength of the insulation of transformers and bushings may also be determined by the evaluation of the direct current/direct voltage curve in the same manner as the method used on large rotating machines. The method previously used in the art to obtain the direct current/alternating current dielectric strength ratio was by cutting the insulation into sections, testing some by direct current and then testing some by alternating current.

Table No. 1 gives a few of the results of many tests where the direct current voltage was built up to a value near puncture, as described previously, and then the prediction of the direct current and alternating current puncture made. An alternating current puncture test was then performed on the same sample and compared with the predicted value. The closeness of the actual to the predicted puncture value should be noted. It should also be noted that the relationship of direct current/alternating current (R. M. S.) dielectric strength is obtained with remarkable reliability by this method.

These tests and many others show that the direct current/alternating current dielectric strength ratio of electrical insulation may be determined by obtaining the direct current/direct voltage curve, and by extrapolation (or by calculation), the direct current puncture may be predicted and the same sample tested with alternating current to puncture under the same conditions.

Experience and test results obtained lead to the conclusion that the best and most reliable method for diagnosing the dielectric strength of insulation is by observing and evaluating the characteristics of the direct current/direct voltage curves obtained on the insulation under test.

TABLE NO. 1

*Predicted A.-C. and actual A.-C. puncture values; 10,000 kva., 11,500 volts, Class-B insulation. Age 28 years*

| Test No. | Max. Applied D.-C. Volts, kv. | Predicted Puncture, kv. | | Max. Applied A.-C. Volts R. M. S., First Build-up | A.-C. Puncture Volts R. M. S., Second Build-up | Ratio D.-C./ A.-C. R. M. S. |
|---|---|---|---|---|---|---|
| | | D.-C. | A.-C. | | | |
| 1 | 32 | 33 | 19.4 | 18.8 punctured | | 1.70 |
| 2 | 30 | 31 | 18.2 | 20.8 punctured | | 1.49 |
| 3 | 38 | 41 | 24.1 | 23-kv. Max. | 20.8 | 1.97 |
| 4 | 37.5 | 39 | 22.9 | 19.3 punctured | | 2.02 |
| 5 | 31 | 32 | 18.8 | 17.1 punctured | | 1.87 |
| 6 | 37.5 | 37.5 | 22.0 | 21.3 punctured | | 1.73 |
| 7 | 32.8 | 33.5 | 19.7 | 17.8 punctured | | 1.88 |
| 8 | 37 | 38 | 22.3 | 23-kv. Max. | 27.4 | 1.37 |
| 9 | 34 | 35 | 20.6 | 23-kv. Max. | 20.4 | 1.75 |
| | | | | | Average | 1.75 |

I claim:

1. The method of diagnosing electrical insulation for determining the dielectric strength thereof which comprises interposing the insulation to be tested in a high voltage direct current circuit, energizing the circuit in varying increments to impress varying values of high voltage direct current on the insulation under tests, measuring the conduction current passing through the insulation, measuring the voltage drop in the circuit due to the interposition therein of the insulation, and plotting the measured values in a system of coordinates to graphically indicate the dielectric strength of the insulation.

2. The method of diagnosing electrical insulation for determining the dielectric strength thereof which comprises interposing the insulation to be tested in a high voltage direct current circuit, energizing the circuit in increasing increments to impress varying values of high voltage direct current on the insulation under tests, measuring the conduction current passing through the insulation, measuring the voltage drop in the circuit due to the interposition therein of the insulation, and plotting the measured values in a system of coordinates to graphically indicate the dielectric strength of the insulation.

3. The method of diagnosing electrical insulation for determining the condition thereof which comprises interposing the insulation to be tested in a high voltage direct current circuit, energizing the circuit in increasing increments to impress varying values of high voltage direct current on the insulation under test, measuring the varying values of conduction current passing through the insulation with each increment of increase of the high voltage direct current, measuring the voltage drop in the circuit due to the interposition therein of the insulation, and plotting the measured values in a system of coordinates to graphically indicate the dielectric strength of the insulation.

4. The method of diagnosing electrical insulation for determining the dielectric strength thereof which comprises interposing the insulation to be tested in a high voltage direct current circuit, energizing the circuit in increasing increments to impress varying values of high voltage direct current on the insulation under test, measuring the conduction current passing through the insulation, measuring the voltage drop in the circuit with each increment of increased high voltage direct current, and plotting the measured values in a system of coordinates to graphically indicate the dielectric strength of the insulation.

5. The method of diagnosing electrical insulation for determining the dielectric strength thereof which comprises interposing the insulation to be tested in a high voltage direct current circuit, energizing the circuit in increasing increments to impress varying values of high voltage direct current on the insulation under test, measuring the varying values of conduction current passing through the insulation with each increment of increase of the high voltage direct current, measuring the voltage drop in the circuit due to the interposition therein of the insulation, and plotting the measured varying values of current versus the measured voltage drop in a suitable system of coordinates to graphically indicate the dielectric strength of the insulation.

6. The method of diagnosing electrical insulation for determining the dielectric strength thereof which comprises interposing the insulation to be tested in a high voltage direct current circuit, energizing the circuit in increasing increments to impress varying values of high voltage direct current on the insulation under test, measuring the varying values of conduction current passing through the insulation with each increment of increase of the high voltage direct current, measuring the voltage drop in the circuit with each increment of increased high voltage direct current, plotting the measured varying values of conduction current versus the measured varying values of voltage drop in a suitable system of coordinates to graphically indicate the dielectric strength of the insulation, and extending the graph so formed for determining the predicted puncture point of the insulation under test by projecting the asymptote of the graph to intercept the voltage ordinate.

7. The method of diagnosing electrical insulation for determining the dielectric strength thereof which comprises interposing the insulation to be tested in a high voltage direct current circuit, energizing the circuit in varying increments to impress varying values of high voltage direct current on the insulation, determining the conductance of the insulation by determining the voltage drop in the circuit due to the interposition therein of the insulation, and plotting the determined values in a system of coordinates to graphically indicate the dielectric strength of the insulation.

8. The method of diagnosing electrical insulation for determining the dielectric strength thereof which comprises interposing the insulation to be tested in a high voltage direct current circuit, energizing the circuit in varying increments to impress varying values of high voltage direct current on the insulation, determining the resistance of the insulation to the flow of current by determining the voltage drop in the circuit due to the flow of current through the insulation, and plotting the determined values in a system of coordinates to graphically indicate the dielectric strength of the insulation.

9. The method of determining the direct current/alternating current dielectric strength ratio of electrical insulation which comprises interposing the insulation to be tested in a high voltage direct current circuit, energizing the circuit in increments to impress varying values of high voltage direct current on the insulation, determining the conduction current passing through the insulation, determining the voltage drop in the circuit due to the interposition therein of the insulation, plotting the determined values in a suitable system of coordinates to a point where a rapid change for a given increment of voltage is graphically indicated, discontinuing the application of direct current before puncture of the insulation occurs, extending the graph to obtain the predicted direct current dielectric strength of the insulation, interposing the insulation in an alternating current circuit, energizing the alternating current circuit in increasing increments to impress increasing values of alternating current until puncture of the insulation occurs, and measuring the maximum value of voltage drop in said alternating current circuit when puncture occurs.

References Cited in the file of this patent

UNITED STATES PATENTS 1,944,211  Brodie  Jan. 23, 1934

OTHER REFERENCES

Electrical Engineering, January 1942, vol. 61, pages 14 to 18, article by Davis et al.